US011819901B2

(12) United States Patent
Sato et al.

(10) Patent No.: US 11,819,901 B2
(45) Date of Patent: Nov. 21, 2023

(54) TOOL FOR PRESS BRAKE

(71) Applicant: Amada Co., Ltd., Kanagawa (JP)

(72) Inventors: Masaaki Sato, Kanagawa (JP); Shiro Hayashi, Kanagawa (JP); Shingo Kamada, Kanagawa (JP); Hideto Yamada, Kanagawa (JP); Yohei Yamaguchi, Kanagawa (JP)

(73) Assignee: AMADA CO., LTD., Kanagawa (JP)

( * ) Notice: Subject to any disclaimer, the term of this patent is extended or adjusted under 35 U.S.C. 154(b) by 0 days.

(21) Appl. No.: 17/259,770

(22) PCT Filed: Jul. 17, 2019

(86) PCT No.: PCT/JP2019/028033
§ 371 (c)(1),
(2) Date: Jan. 12, 2021

(87) PCT Pub. No.: WO2020/017539
PCT Pub. Date: Jan. 23, 2020

(65) Prior Publication Data
US 2021/0339303 A1   Nov. 4, 2021

(30) Foreign Application Priority Data

Jul. 17, 2018 (JP) ................................ 2018-134151
Jul. 17, 2018 (JP) ................................ 2018-134168
(Continued)

(51) Int. Cl.
*B21D 37/14* (2006.01)
*B21D 5/02* (2006.01)
(Continued)

(52) U.S. Cl.
CPC ............. *B21D 37/145* (2013.01); *B21D 5/02* (2013.01); *B21D 5/0209* (2013.01);
(Continued)

(58) Field of Classification Search
CPC ........ B21D 37/145; B21D 37/04; B21D 5/02; B21D 5/0209; B21D 5/0236;
(Continued)

(56) References Cited

U.S. PATENT DOCUMENTS 7,168,286 B1    1/2007  Pelech
7,632,224 B2   12/2009  Rouweler et al.
(Continued)

FOREIGN PATENT DOCUMENTS

CN      101081478 A    12/2007
CN      105992658 A    10/2016
(Continued)

OTHER PUBLICATIONS

Machinery's Handbook 27th ed, p. 1230 (Year: 2004).*
(Continued)

*Primary Examiner* — Adam J Eiseman
*Assistant Examiner* — Fred C Hammers
(74) *Attorney, Agent, or Firm* — Renner, Otto, Boisselle & Sklar, LLP

(57) ABSTRACT

A tool for a press brake includes a tool main body, an attachment portion formed on a base end side of the tool main body and configured to be detachably attached to a tool installation portion of the press brake by using a tool changer, and a bending portion formed on a distal end side of the tool main body and used to bend a plate-shaped workpiece. An engagement hole having a circular cross-sectional shape to be engaged with a bar-shaped finger of the tool changer extends through the tool main body in a thickness direction. An anti-rotation bottomed depressed portion configured to receive a distal end of an anti-rotation member of the tool changer is formed in a vicinity of the engagement hole.

5 Claims, 17 Drawing Sheets

(30) Foreign Application Priority Data

| Jul. 27, 2018 | (JP) | 2018-140886 |
|---|---|---|
| Sep. 11, 2018 | (JP) | 2018-169366 |
| May 7, 2019 | (JP) | 2019-087437 |
| May 16, 2019 | (JP) | 2019-092892 |
| Jun. 12, 2019 | (JP) | 2019-109717 |
| Jun. 14, 2019 | (JP) | 2019-111277 |
| Jul. 8, 2019 | (JP) | 2019-126935 |

(51) Int. Cl.
  *B23Q 3/155* (2006.01)
  *B21D 37/04* (2006.01)

(52) U.S. Cl.
  CPC ......... *B21D 5/0236* (2013.01); *B21D 5/0254* (2013.01); *B21D 37/04* (2013.01); *B23Q 3/15573* (2013.01)

(58) Field of Classification Search
  CPC .. B21D 5/0254; B23Q 3/1552; B23Q 3/1554; B23Q 3/1556
  USPC ........................................ 72/481.1, 482.92
  See application file for complete search history.

(56) References Cited

U.S. PATENT DOCUMENTS

| 10,500,623 | B2 | 12/2019 | Meneghetti | |
| 2003/0064871 | A1* | 4/2003 | Akami | B21D 37/145 483/1 |
| 2007/0271987 | A1 | 11/2007 | Shimizu et al. | |
| 2007/0297889 | A1 | 12/2007 | Rouweler et al. | |
| 2014/0326036 | A1 | 11/2014 | Hayashi | |
| 2016/0136706 | A1* | 5/2016 | Mayrhofer | B21D 5/0236 72/481.1 |
| 2016/0354821 | A1 | 12/2016 | Meneghetti | |

FOREIGN PATENT DOCUMENTS

| CN | 106 734 644 A | 5/2017 |
|---|---|---|
| DE | 100 60 405 B4 | 3/2007 |
| EP | 1 160 024 A1 | 12/2001 |
| EP | 1862255 A1 | 12/2007 |
| JP | S58 76326 U | 5/1983 |
| JP | 6-234018 A | 8/1994 |
| JP | H09 220618 A | 8/1997 |
| JP | H10211521 A | 8/1998 |
| JP | H10263708 A | 10/1998 |
| JP | H1110235 A | 1/1999 |
| JP | 2000071028 A | 3/2000 |
| JP | 2004337950 A | 12/2001 |
| JP | 2006000855 A | 1/2006 |
| JP | 4558852 B2 | 10/2010 |
| JP | 4672868 B2 | 4/2011 |
| JP | 2013111610 A | 6/2013 |
| JP | 5252837 B2 | 7/2013 |
| JP | 2014-91137 A | 5/2014 |
| JP | 5841800 B2 | 1/2016 |
| WO | 2008050458 A1 | 5/2008 |
| WO | 2015118505 A3 | 8/2015 |
| WO | 2016/023057 A1 | 2/2016 |
| WO | 2016/054668 A1 | 4/2016 |
| WO | 2017212386 A1 | 12/2017 |
| WO | 2018065965 A1 | 4/2018 |

OTHER PUBLICATIONS

Extended European Search Report for corresponding EP Application No. 19837688.1, dated Aug. 2, 2021.
Extended European Search Report for corresponding EP Application No. 19838058.6, dated Aug. 6, 2021.
Extended European Search Report for corresponding EP Application No. 19838694.8, dated Aug. 6, 2021.
Extended European Search Report for corresponding EP Application No. 19837570.1, dated Aug. 12, 2021.
International Search Report for corresponding Application No. PCT/JP2019/028033, dated Oct. 21, 2019.
Written Opinion for corresponding Application No. PCT/JP2019/028033, dated Oct. 21, 2019.
European Search Report for corresponding Application No. 20805835.4, dated May 30, 2022.
European Search Report for corresponding Application No. 20802239.2, dated May 23, 2022.

* cited by examiner

Fig. 9
(a)
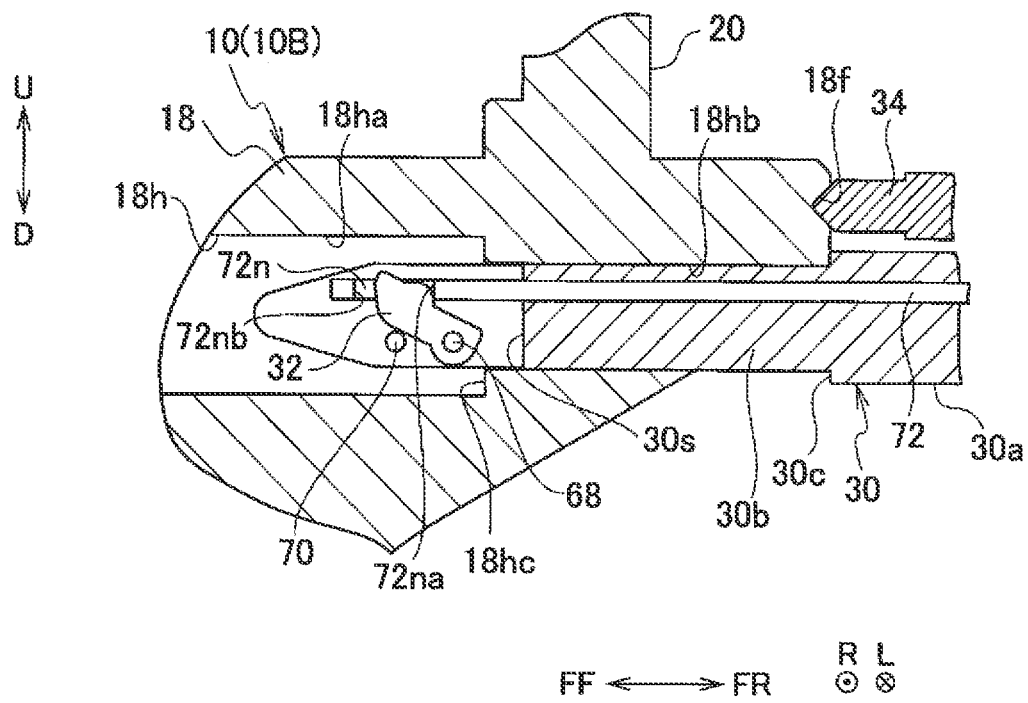
(b)
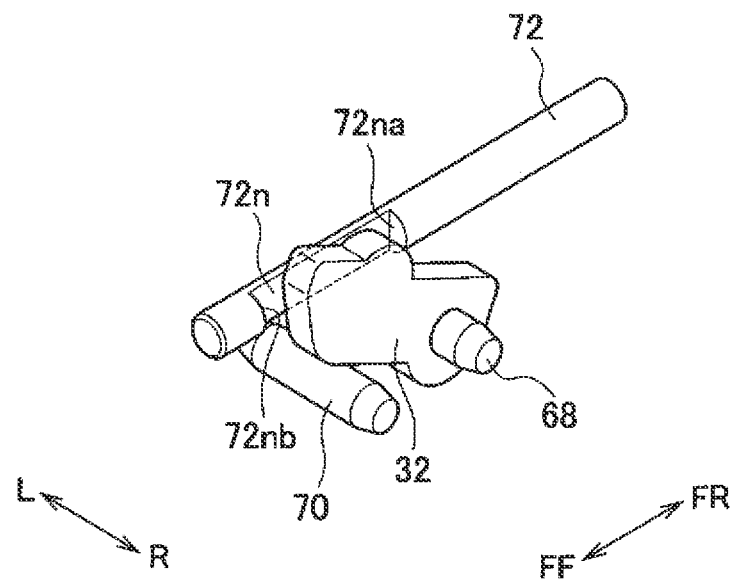

Fig. 10
(a)
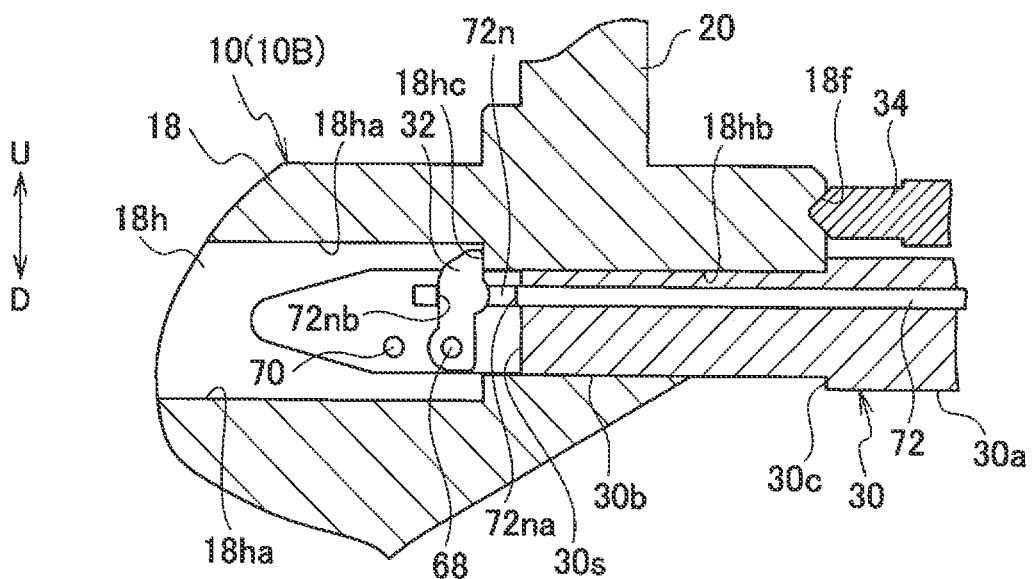
(b)
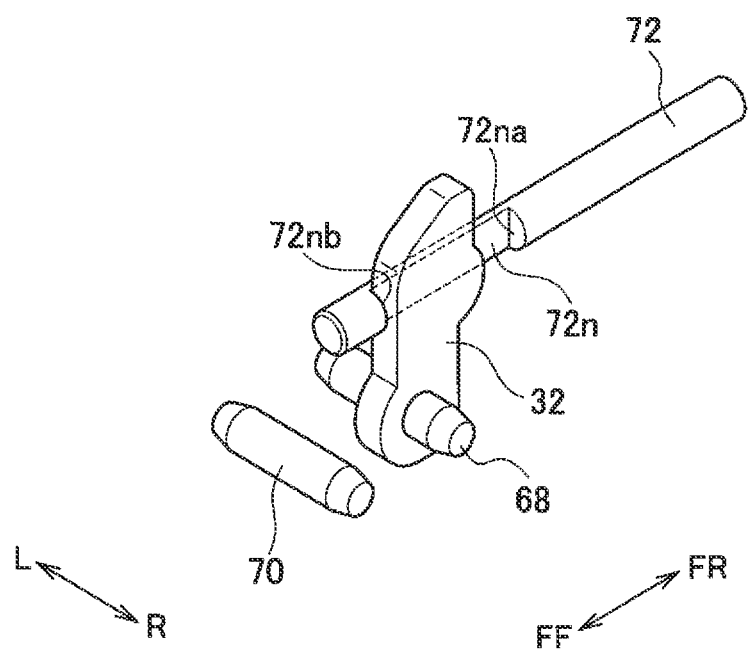

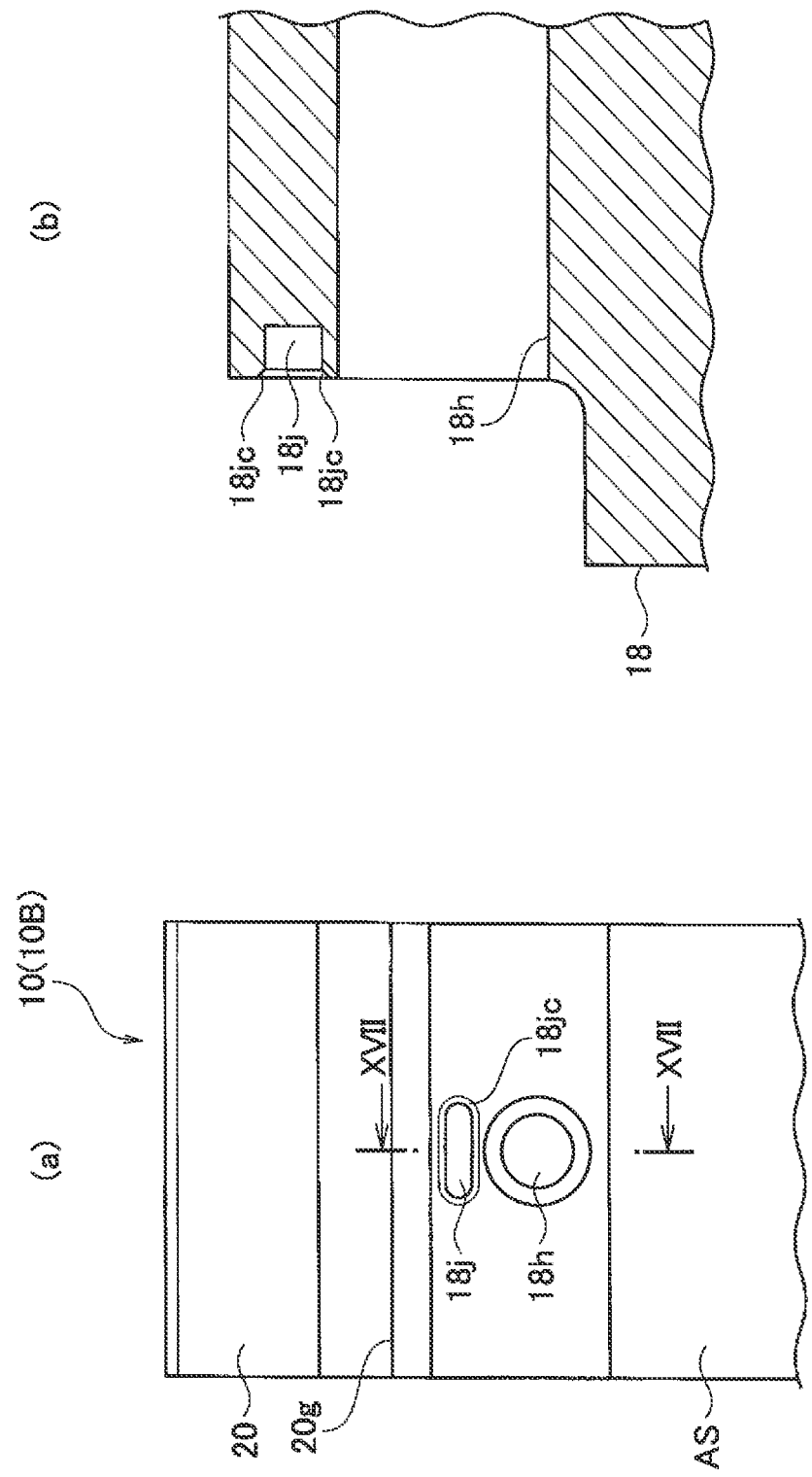

TOOL FOR PRESS BRAKE

TECHNICAL FIELD

The present invention relates to a tool to be detachably attached to a tool installation portion of a press brake.

BACKGROUND ART

To automatically change a tool for a tool installation part of a press brake, an automatic tool changer (ATC) may be used (see Patent Literatures 1 to 3 below). Patent Literatures 1 to 3 disclose an upper tool as a tool to be automatically changed.

The upper tool disclosed in Patent Literatures 1 to 3 comprises a tool main body. On a base end side of the tool main body, an attachment portion (a shank) to be detachably attached to the tool installation part of the press brake is formed. On a tip side of the tool main body, a bending portion to bend a plate-shaped workpiece is formed. In each of opposite surfaces (a front surface and a back surface) of the attachment portion, a V-shaped groove engaged with a locking piece of the tool installation part is formed along a lateral direction.

Below the V-shaped groove in the surface of the attachment portion, an accommodation depressed portion extending in a vertical direction is formed. In the accommodation depressed portion, an anti-drop operation member extending in the vertical direction is accommodated movably in a thickness direction (a direction along a thickness of a tool). At an upper end of the operation member, an engagement protrusion that is engageable in an engagement groove of the tool installation part is provided. Then, at a lower end of the operation member, a push button to release an engaged state of the engagement protrusion in the engagement groove of the tool installation part is provided. Additionally, for the tool to be automatically changed as disclosed in Patent Literatures 1 and 2, an elongated hole, into which a hook member of the tool changer is inserted for operating the push button, extends through the tool below the push button in the thickness direction. The elongated hole is formed to be long in the vertical direction.

Note that in addition to Patent Literatures 1 to 3, Patent Literature 4 described below is also associated prior technical literature.

CITATION LIST

Patent Literatures

Patent Literature 1: Japanese Patent No. 4558852
Patent Literature 2: Japanese Patent No. 4672868
Patent Literature 3: Japanese Patent No. 5252837
Patent Literature 4: Japanese Patent No. 5841800

SUMMARY OF INVENTION

In a tool to be automatically changed, disclosed in Patent Literatures 1 and 2, as components for automatic change of the tool with respect to a tool installation portion of a press brake, an operation member extending in a vertical direction and elongated holes extending in the vertical direction and arranged in series in the vertical direction to the operation member are required. Furthermore, in a tool to be automatically changed, disclosed in Patent Literature 3, as such a component, an operation member extending in a vertical direction is required. That is, a height of the tool to be automatically changed, disclosed in Patent Literatures 1 to 3, is larger than a height of a usual tool. Therefore, the usual tool may be post-processed, and modified to obtain the tool to be automatically changed.

Furthermore, the elongated hole extends through an attachment portion of the tool to be automatically changed, disclosed in Patent Literatures 1 and 2, in a thickness direction below a push button. In the tool to be automatically changed, disclosed in Patent Literature 3, a bush, to which a manipulator of a tool changer is nonrotatably coupled, is mounted in the tool, and this bush is threaded (or the bush is formed to have a rectangular cross section). Therefore, the tool to be automatically changed, disclosed in Patent Literatures 1 to 3, is not easy to produce, and much time is required for the production of the tool, to be automatically changed.

An object of the present invention is to provide a tool for a press brake, which is easy to produce and is suitable for automatic change.

As a first feature of the present invention provides a tool for a press brake including a tool main body, an attachment portion formed on a base end side of the tool main body and configured to be detachably attached to a tool installation portion of the press brake by using a tool changer, and a bending portion formed on a distal end side of the tool main body and used to bend a plate-shaped workpiece, wherein an engagement hole having a circular cross-sectional shape to be engaged with a bar-shaped finger of the tool changer extends through the tool main body in a thickness direction, and an anti-rotation bottomed depressed portion configured to receive a distal end of an anti-rotation member of the tool changer is formed in a vicinity of the engagement hole in the tool main body.

As a second feature of the present invention provides a tool for a press brake including a tool main body, an attachment portion formed on a base end side of the tool main body and configured to be detachably attached to a tool installation portion of the press brake, and a bending portion formed on a distal end side of the tool main body and used to bend a plate-shaped workpiece, wherein a through hole having a circular cross-sectional shape is formed in a thickness direction in the tool main body, and a bottomed depressed portion is formed in a vicinity of the through hole in the tool main body.

BRIEF DESCRIPTION OF DRAWINGS

FIG. 9(a) is a side cross-sectional view showing a behavior prior to engagement of an engagement piece in an inner stepped portion of an engagement hole, and FIG. 9(b) is a perspective view showing a behavior that the engagement piece is pushed by a push face of the finger to abut on a stopper.

FIG. 10(a) is a cross-sectional view showing a behavior that the engagement piece is engaged with the inner stepped portion of the engagement hole, and FIG. 10(b) is a perspective view showing a behavior that the engagement piece is pulled up with a pull face of the finger.

FIG. 17(a) is a partial front view of the goose-neck type upper tool in which an anti-rotation bottomed depressed portion (an elongated hole having a rectangular cross section) is formed in the tool main body, and FIG. 17(b) is a cross-sectional view taken along the XVII-XVII line in FIG. 17(a).

DESCRIPTION OF EMBODIMENT

Figure 1:
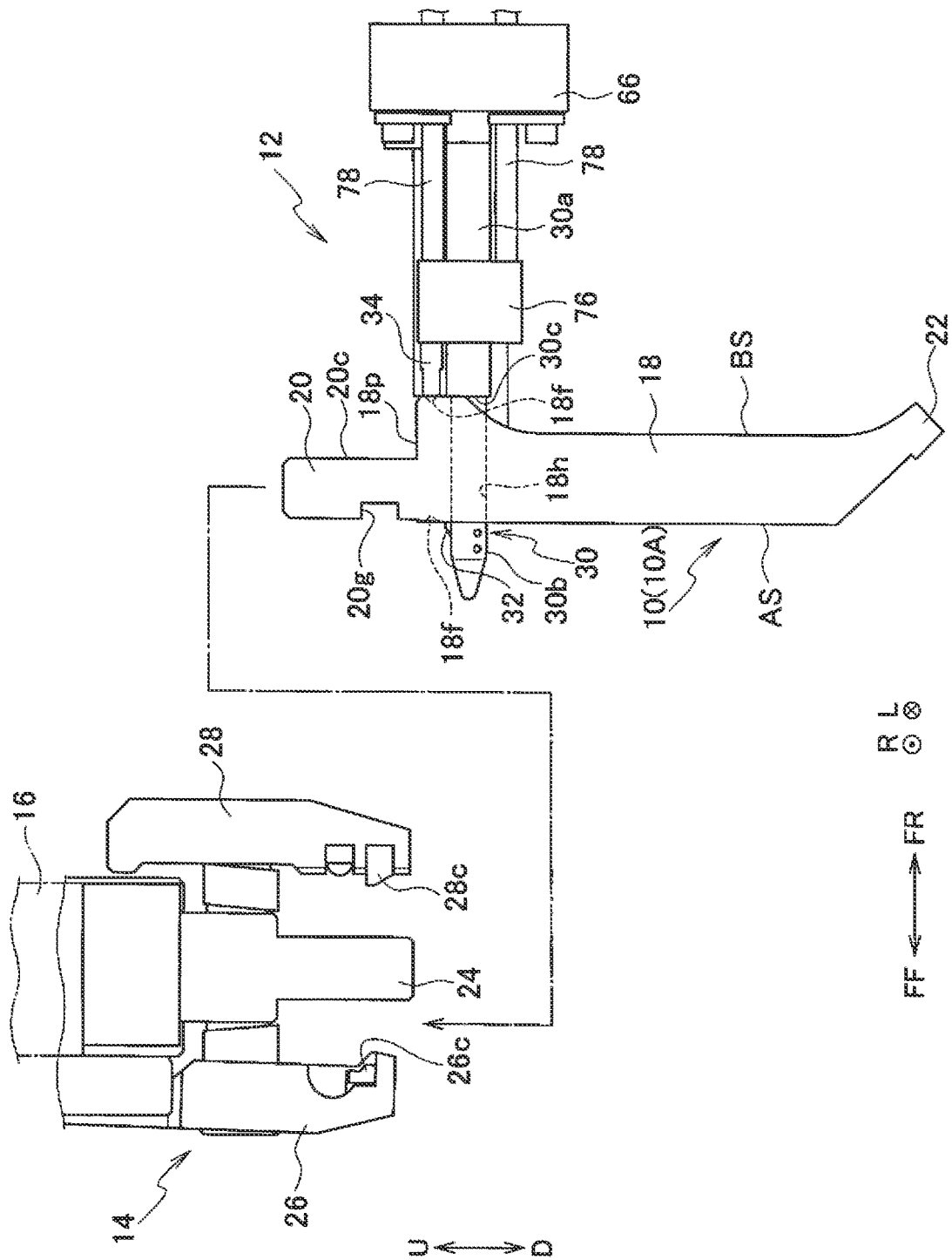
FIG. 1 is a side view showing a standard type upper tool according to an embodiment and an upper tool holder of a press brake.

Hereinafter, description will be made as to a tool for a press brake according to an embodiment with reference to the drawings.

Note that "a tool changer" includes a manipulator that performs automatic change of a tool. "A circular cross-sectional shape" is not limited to a precisely circular cross-sectional shape, and includes a substantially circular shape close to the circular cross-sectional shape. In the drawings, "FF" indicates a front direction, "FR" indicates a rear direction, "L" indicates a left direction, "R" indicates a right direction, "U" indicates an up direction, and "D" indicates a down direction.

Figure 2:
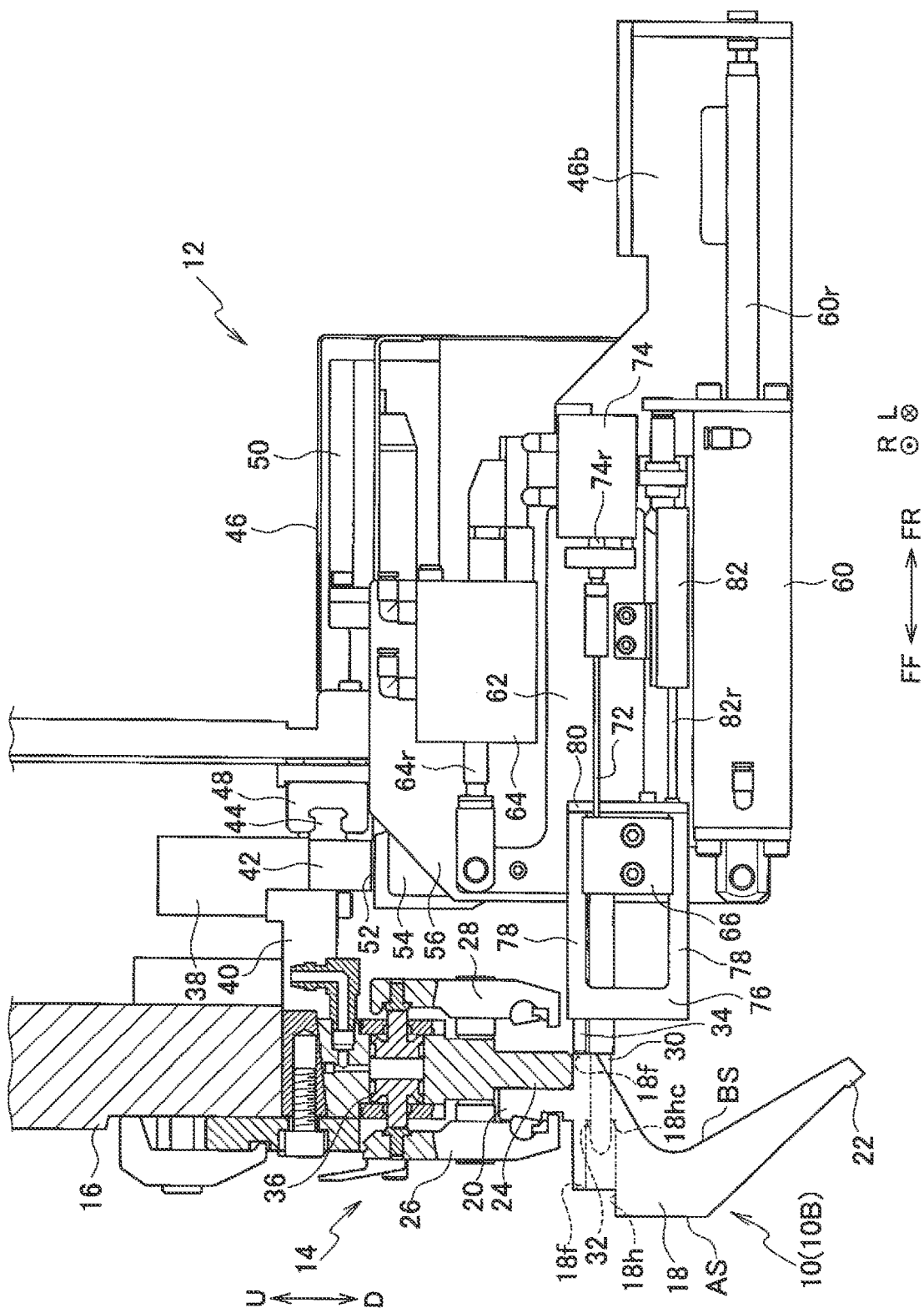
FIG. 2 is a side view showing a goose-neck type upper tool according to the embodiment and the upper tool holder of the press brake.

As shown in FIG. 1 and FIG. 2, an upper tool (a tool) 10 according to an embodiment is automatically changed for a plurality of upper tool holders 14 (only one is shown) as tool installation parts of a press brake by using a tool changer 12. The tool changer 12 is disposed on a rear side of (behind) an upper table 16 of the press brake. The plurality of upper tool holders 14 are provided via a space in a right-left direction at a lower end of the upper table 16. Note that a dashed-dotted line arrow in FIG. 1 only indicates an installation position of the upper tool 10, and does not indicate an installation path of the upper tool 10.

FIG. 3(a) and FIG. 3(b) show a standard type upper tool 10 (10A), and FIG. 4(a) and FIG. 4(b) show a goose-neck type upper tool 10 (10B). FIG. 5(a) and FIG. 5(b) show a goose-neck type upper tool 10 (10C) with an expanded portion. Note that in FIG. 1 and FIG. 7 to FIG. 17, the goose-neck type upper tool 10 (10B) is shown as a representative of the upper tool 10 according to the embodiment.

Figure 3:
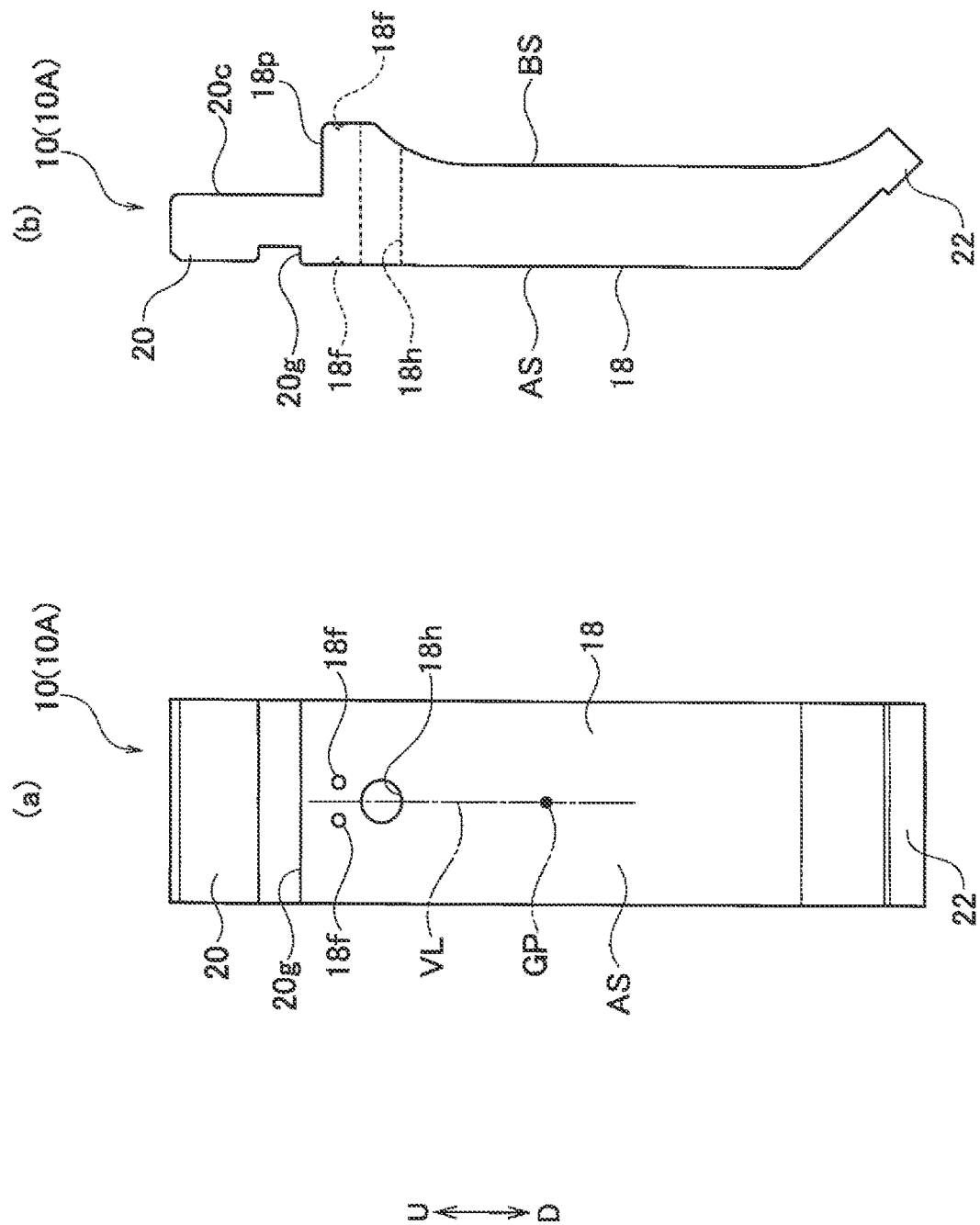
FIG. 3($a$) is a front view of the above standard type upper tool, and FIG. 3($b$) is a side view of the upper tool.
Figure 4:
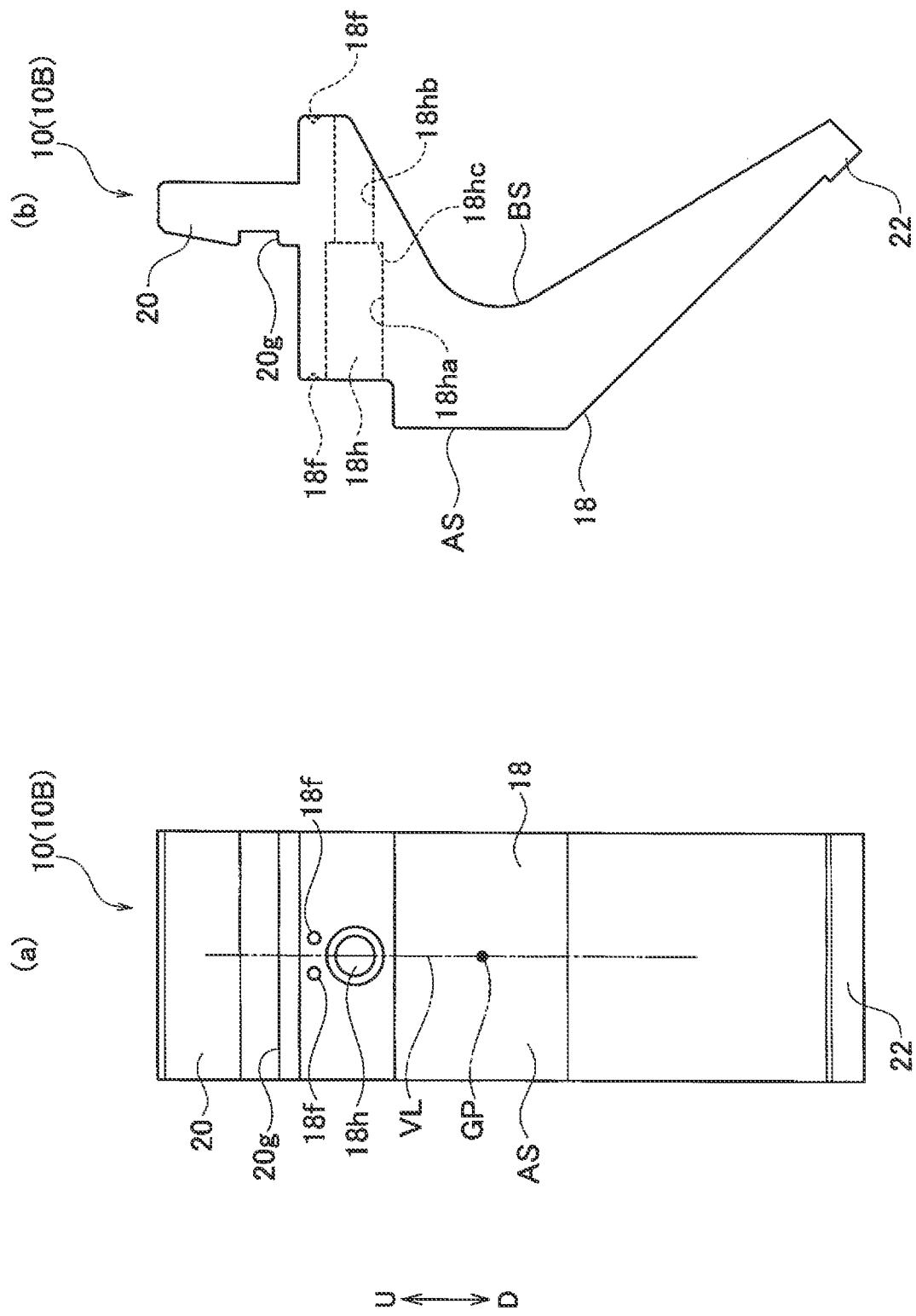
FIG. 4($a$) is a front view of the above goose-neck type upper tool, and FIG. 4($b$) is a side view of the upper tool.
Figure 5:
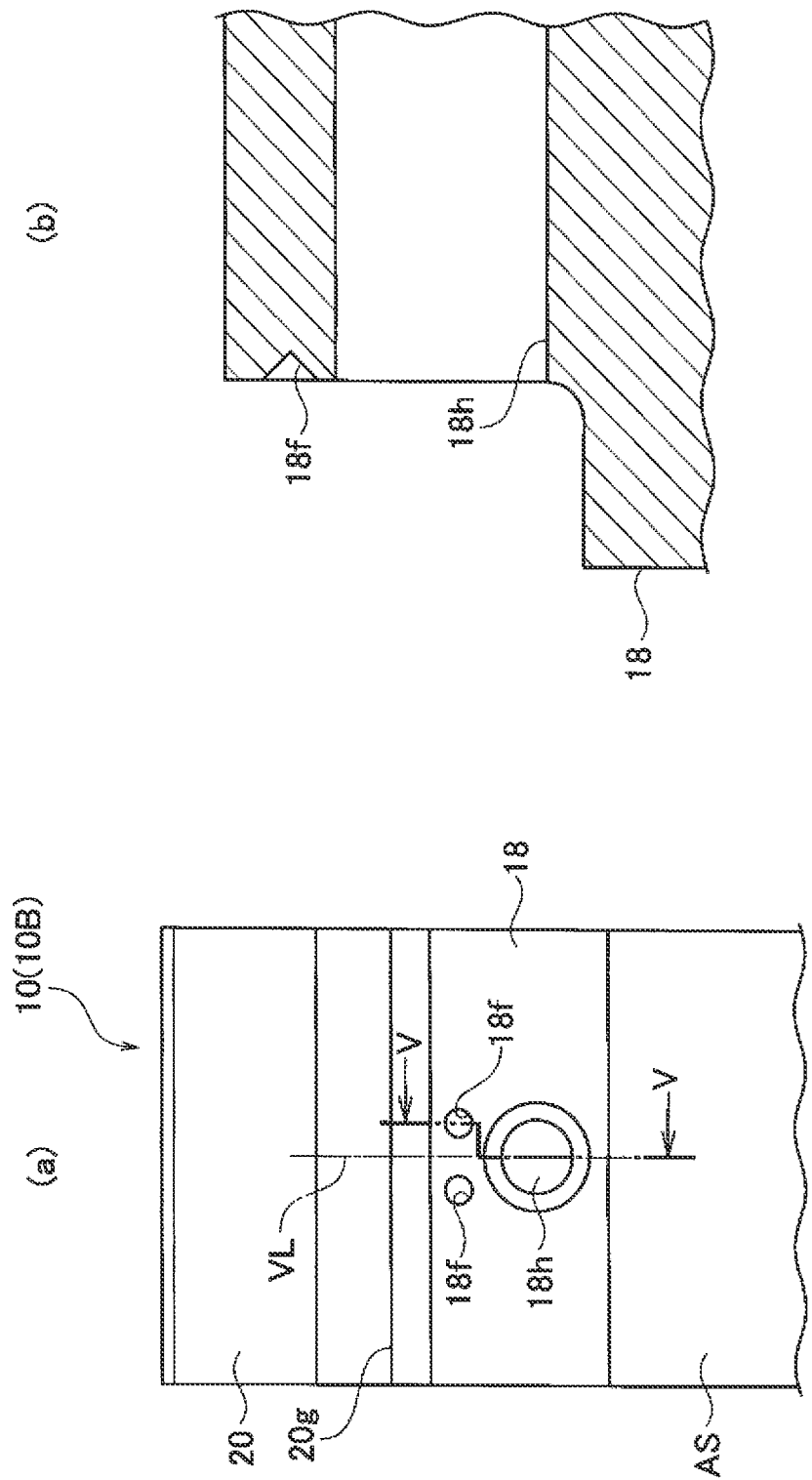
FIG. 5($a$) is a partial front view of the goose-neck type upper tool in which a plurality of anti-rotation bottomed depressed portions (conical holes) are formed in the tool main body, and FIG. 5($b$) is a cross-sectional view taken along the V-V line in FIG. 5($a$).
Figure 6:
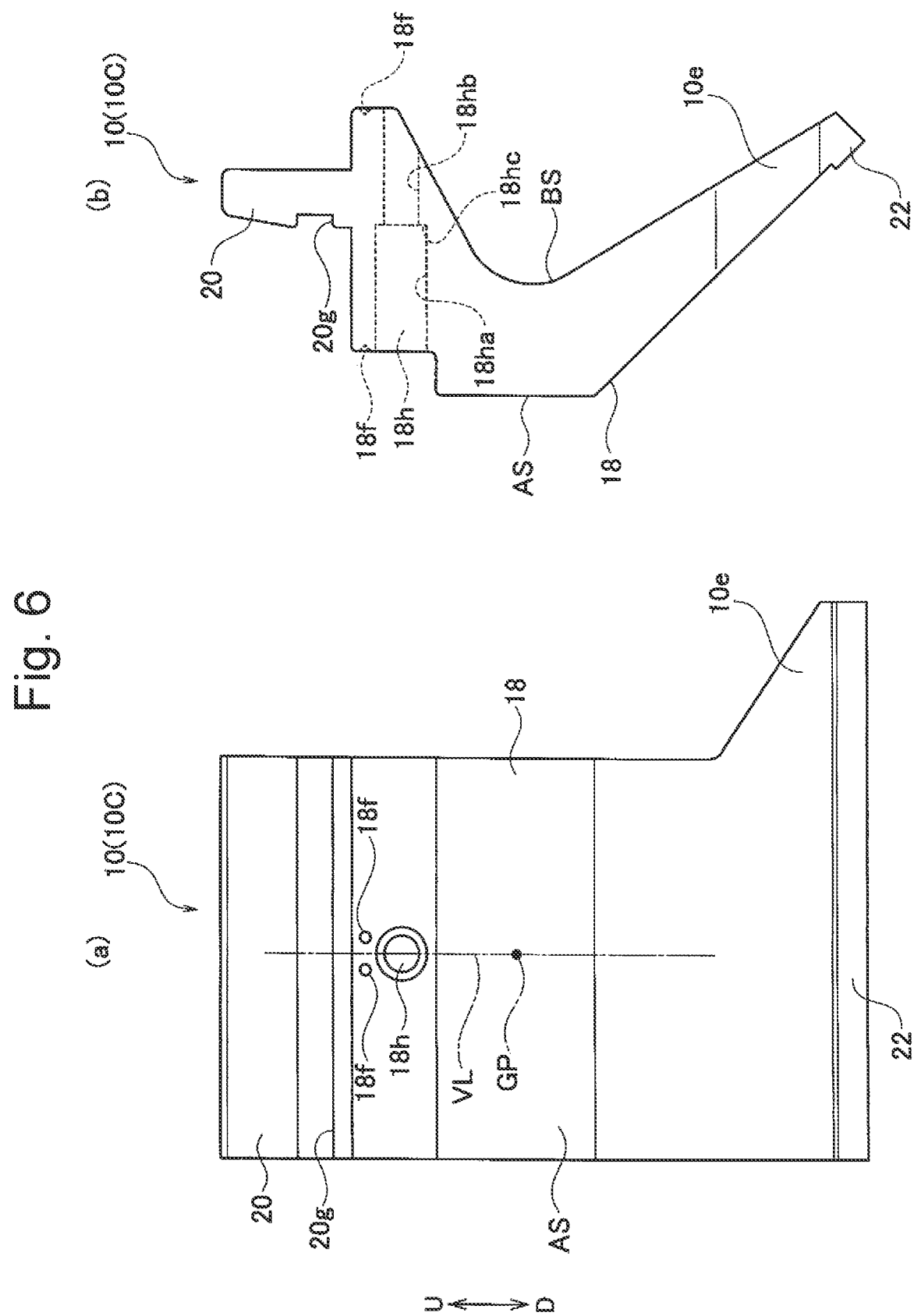
FIG. 6($a$) is a front view of the goose-neck type upper tool (with an expanded portion) according to the embodiment, and FIG. 6($b$) is a side view of the upper tool.

As shown in FIG. 3, FIG. 4 and FIG. 6, the upper tool 10 includes a tool main body 18. On a base end side (an upper end side) of the tool main body 18, an attachment portion 20 to be detachably attached to the upper tool holder 14 by the tool changer 12 is formed. Or a tip side (a lower end side) of the tool main body 18, a bending portion 22 to bend a plate-shaped workpiece (not shown) is formed.

As shown in FIG. 1 to FIG. 4 and FIG. 6, the attachment portion 20 includes a vertical contact surface 20c on a back side thereof. In a state where an anterior surface AS of the upper tool 10 faces forward, the contact surface 20c of the attachment portion 20 comes in contact with a front surface of a holder main body 24 of the upper tool holder 14. In a state where the anterior surface AS of the upper tool 10 faces forward, the attachment portion 20 is fixed to the holder main body 24 by a first clamp 26 of the upper tool holder 14. Furthermore, in a state where a back surface BS of the upper tool 10 faces forward due to a turn-over of an orientation of the upper tool 10, the contact surface 20c of the attachment portion 20 comes in contact with a rear surface of the holder main body 24 of the upper tool holder 14. In the state where the back surface BS of the upper tool 10 faces forward, the attachment portion 20 is fixed to the holder main body 24 by a second clamp 28 of the upper tool holder 14. Furthermore, on a front side of the attachment portion 20, an anti-drop groove 20g is formed along a lateral direction (a direction along a width of the upper tool 10).

A portion of the tool main body 18 which is close to the attachment portion 20 is thicker than another portion of the tool main body 18. The tool main body 18 includes, in an upper part thereof, a pressure receiving face 18p that receives press force (pressurizing force) of the upper table 16. The pressure receiving face 18p of the tool main body 18 is at right angles to the contact surface 20c of the attachment portion 20.

As shown in FIG. 3 to FIG. 6, correspondent position, in the lateral direction, in the tool main body 18 to a gravity-center position GP (of the upper tool 10), an engagement hole 18h having a circular cross-sectional shape to be engaged with a round-bar shaped finger 30 in the tool changer 12 extends in a thickness direction (a direction along a thickness of the upper tool 10). The engagement hole 18h is a through hole having a circular cross-sectional shape and formed in the thickness direction. Note that in a case where the upper tool 10 does not include an expanded portion 10e (see FIG. 5) protruded outwardly in the lateral direction, that is, in a case where a front view shape of the upper tool 10 is a rectangular shape, the gravity-center position GP in the tool main body 18 is positioned on a center line of the tool main body 18 in the lateral direction. When it is described that "the engagement hole 18*h* is positioned at the correspondent position, in the lateral direction, to the gravity-center position GP", it is indicated that in the front view, a center of the engagement hole 18*h* is positioned on a vertical line passing the gravity-center position GP (i.e., a straight line at right angles to a straight line extending in the lateral direction).

As shown in FIG. 1 and FIG. 3, in a case where the finger 30 is inserted into the engagement hole 18*h* from a back surface BS side of the upper tool 10A with the anterior surface AS of the upper tool 10A facing forward, a peripheral edge portion of the engagement hole 18*h* on a front side is formed as an engaged portion to be engaged with an engagement piece 32 of the finger 30 (see FIG. 1). In a case where the finger 30 is inserted into the engagement hole 18*h* from an anterior surface AS side of the upper tool 10A with the back surface BS of the upper tool 10A facing forward due to the turn-over of the orientation of the upper tool 10A, a peripheral edge portion of the engagement hole 18*h* on a back side is formed as an engaged portion to be engaged with the engagement piece 32 of the finger 30.

As shown in FIG. 2 and FIG. 4 to FIG. 6, each of the respective engagement holes 18*h* of the upper tools 10B and 10C includes a large-diameter portion 18*ha* on the anterior surface AS side, and includes a small-diameter portion 18*hb* on the back surface BS side. At an intermediate position of the engagement hole 18*h* (a boundary between the large-diameter portion 18*ha* and the small-diameter portion 18*hb*), a ring-shaped inner stepped portion 18*hc* is formed. In a case where the finger 30 is inserted into the engagement hole 18*h* from the hack surface BS side of the upper tool 10B or 10C with the anterior surface AS of the upper tool 10B or 10C facing forward, the inner stepped portion 18*hc* is formed as an engaged portion to be engaged with the engagement piece 32 of the finger 30 (see FIG. 2). In a case where the finger 30 is inserted into the engagement hole 18*h* of the tool main body 18 from the anterior surface AS side of the upper tool 10B or 10C with the back surface BS of the upper tool 10B or 10C facing forward, a peripheral edge portion of the engagement hole 18*h* on the back side is formed as an engaged portion to be engaged with the engagement piece 32 of the finger 30.

As shown in FIG. 3 to FIG. 8, a plurality of conical holes 18*f* are formed as a plurality of anti-rotation bottomed depressed portions in a vicinity of the engagement hole 18*h* on each of opposite surfaces (the anterior surface AS and the back surface BS) of the tool main body 18. Each conical hole 18*f* may receive a distal end of each pin-shaped anti-rotation member 34 of the tool changer 12. The conical holes 18*f* are positioned above the engagement hole 18*h* of the tool main body 18. An opening area of each conical hole 18*f* is smaller than an opening area of the engagement hole 18*h*. The conical holes 18*f* are engageable with the distal ends of the pin-shaped anti-rotation members 34, respectively, and come in contact with line contact or surface contact, with the distal ends of the anti-rotation members 34, respectively. The plurality of conical holes 18*f* are arranged in a linearly symmetrical manner to a predetermined virtual line VL. The predetermined virtual line VL is a virtual line passing a center of the engagement hole 18*h* in parallel with the vertical direction (of the upper tool 10). Note that if at least one of the plurality of conical holes 18*f* is engageable with the distal end of the anti-rotation member 34, the remaining conical holes 18*f* do not have to be engageable with the distal ends of the anti-rotation members 34.

Subsequently, a configuration of the upper tool holder 14 will be described.

As shown FIG. 1 and FIG. 2, the upper tool holder 14 includes such a known configuration as disclosed in Patent Literature 4, and includes the holder main body 24 at the lower end of the upper table 16 as described above. Furthermore, on a front side of the holder main body 24, the first clamp 26 that is swingable in the front-rear direction to press the attachment portion 20 of the upper tool 10 onto the front surface of the holder main body 24 is provided. On a rear side of the holder main body 24, provided is the second clamp 28 that is swingable in the front-rear direction to press the attachment portion 20 of the upper tool 10 onto a rear surface of the holder main body 24. A pressing operation of the first clamp 26 and the second clamp 28 and an operation of releasing the pressing operation are performed by driving a clamp cylinder 36 provided above the holder main body 24. The first clamp 26 includes, in a lower part thereof, an engagement hook 26*c* that is engageable in the anti-drop groove 20*g* of the attachment portion 20. The second clamp 28 includes, in a lower part thereof, an engagement hook 28*c* that is engageable in the anti-drop groove 20*g* of the attachment portion 20.

Subsequently, a configuration of the tool changer 12 will be described.

As shown in FIG. 2, the tool changer 12 automatically changes (installs and removes) the upper tool 10 for a plurality of upper tool holders 14 as tool installation parts. The tool changer 12 automatically changes the upper tool 10 for an upper stocker (not shown) in a tool storage (not shown) disposed on a left or right side of the press brake. In other words, the tool changer 12 automatically changes the upper tool 10 between the plurality of upper tool holders 14 and the upper stocker.

Behind the upper table 16, a beam member 38 extending in the right-left direction is provided via a plurality of connecting members 40 (only one is shown). The beam member 38 is provided with a rack member 42 extending in the right-left direction. A guide rail 44 extending in the right-left direction is attached to the rack member 42. The guide rail 44 is coupled to a box-shaped first slider 46 that is movable in the right-left direction, via a plurality of linear sliders 48. The first slider 46 includes a bracket 46*b* in a rear part thereof. At a suitable position of the first slider 46, a servo motor 50 is provided as an actuator that slides the first slider 46 (relative to the upper table 16) in the right-left direction. A pinion gear 52 is fixed to an output shaft of the servo motor 50, and the pinion gear 52 meshes with the rack member 42. Thus, the servo motor 50 is driven, so that the first slider 46 may slide in the right-left direction.

A base plate 54 is attached to a right side of the first slider 46. The base plate 54 is coupled to a second slider 56 that is movable in the front-rear direction, via a guide member 58. At a suitable position of the second slider 56, a hydraulic cylinder 60 is provided as a moving actuator that moves the second slider 56 in the front-rear direction relative to the first slider 46 and the base plate 54. The hydraulic cylinder 60 includes a piston rod 60*r* that can make a stroke in the front-rear direction, and a rear end of the piston rod 60*r* is connected to a bracket 46*b* of the first slider 46. Thus, the hydraulic cylinder 60 is driven, so that the second slider 56 may slide in the front-rear direction.

The second slider 56 is provided with a third slider 62 that is movable in the front-rear direction, via a guide member (not shown). At suitable position of the second slider 56, a hydraulic cylinder 64 is provided as an actuator that slides the third slider 62 (relative to the second slider 56) in the front-rear direction. The hydraulic cylinder 64 includes a piston rod 64r that is movable in the front-rear direction, and a tip of the piston rod 64r is coupled to a suitable position of the third slider 62. Thus, the hydraulic cylinder 64 is driven, so that the third slider 62 may move relative to the second slider 56 in the front-rear direction.

In a case where the finger 30 is inserted into the engagement hole 18h from the back surface BS side of the upper tool 10 with the anterior surface AS of the upper tool 10 facing forward, the third slider 62 is brought into a state shown in FIG. 2. On the other hand, in a case where the finger 30 is inserted into the engagement hole 18h from the anterior surface AS side of the upper tool 10 with the back surface BS of the upper tool 10 facing forward, the hydraulic cylinder 64 is driven to move the third slider 62 rearward from the state shown in FIG. 2.

As shown FIG. 2 and FIG. 7 to FIG. 10, a support block 66 is attached to a front part of the third slider 62. The finger that supports the upper tool 10 protrudes forward from a front surface of the support block 66. The finger 30 extends in the front-rear direction, and may be inserted is to the engagement hole 18h of the upper tool 10. The finger 30 includes a large-diameter portion 30a on a base end side thereof, and includes a small-diameter portion 30b that is insertable into the engagement hole 18h, on a tip side thereof. A tip (a front end) of the finger 30 is formed in a conical shape tapered shape). At an intermediate position of the finger 30 (a boundary between the large-diameter portion 30a and the small-diameter portion 30b), a ring-shaped outer stepped portion 30c that is abuttable on the tool main body 18 is formed.

A slit 30s is formed at a tip of the small-diameter portion 30b of the finger 30. In the slit 30s, the engagement piece 32 that is swingable in an up-down direction is attached via a pivot pin 68. The engagement piece 32 is a part of the finger 30, and is capable of being protruded and retracted relative to an outer peripheral surface of the finger 30 when swinging in the up-down direction. The engagement piece 32 protrudes from the outer peripheral surface of the finger 30, to engage with the peripheral edge portion of the engagement hole 18h or the inner stepped portion 18hc of the engagement hole 18h. Note that a stopper 70 that regulates downward swinging of the engagement piece 32 is also provided in the slit 30s of the finger 30.

In the finger 30, an operation rod 72 extending in the front-rear direction and movable in the front-rear direction is provided. At a tip (a front end) of the operation rod 72, a cutout 72n is formed, and a tip of the engagement piece 32 is intruded in the cutout 72n. A push face 72na that pushes the engagement piece 32 forward to swing the piece downward is formed at a rear end of the cutout 72n. On the other hand, a pull face 72nb that pulls the engagement piece 32 rearward to swing the piece upward is formed at a front end of the cutout 72n.

At a suitable position of the third slider 62, a hydraulic cylinder 74 is provided as an actuator that swings the engagement piece 32 in the up-down direction. The hydraulic cylinder 74 includes a piston rod 74r that is movable in the front-rear direction, and a tip of the piston rod 74r is coupled to a base end (a rear end) of the operation rod 72. By driving the hydraulic cylinder 74, the operation rod 72 is moved in the front-rear direction, and the engagement piece 32 is swung in the up-down direction to be capable of being protruded and retracted relative to the outer peripheral surface of the finger 30. The tool changer 12 clamps the upper tool 10 between the engagement piece 32 protruded from an outer peripheral surface of a tip portion of the finger 30 and the outer stepped portion 30c of the finger 30.

A configuration where the engagement piece 32 is capable of being protruded and retracted relative to the outer peripheral surface of the finger 30 is not limited to the above described configuration, and any suitable configuration may be employed. For example, a movable pin may be provided in a tip portion of the operation rod 72, and the pin may be engaged in a slot formed in the engagement piece 32, so that according to this structure, the engagement piece 32 is capable of being protruded and retracted relative to the outer peripheral surface of the finger 30. Alternatively, the operation rod 72 may be provided with a cam or wedge member, and the cam or wedge member may be brought into contact with the engagement piece 32, so that according to this structure, the engagement piece 32 is capable of being protruded and retracted relative to the outer peripheral surface of the finger 30. Furthermore, the finger 30 is not limited to the round bar shape, and may be formed in a polygonal-bar shape such as a square bar-shape.

Figure 7:
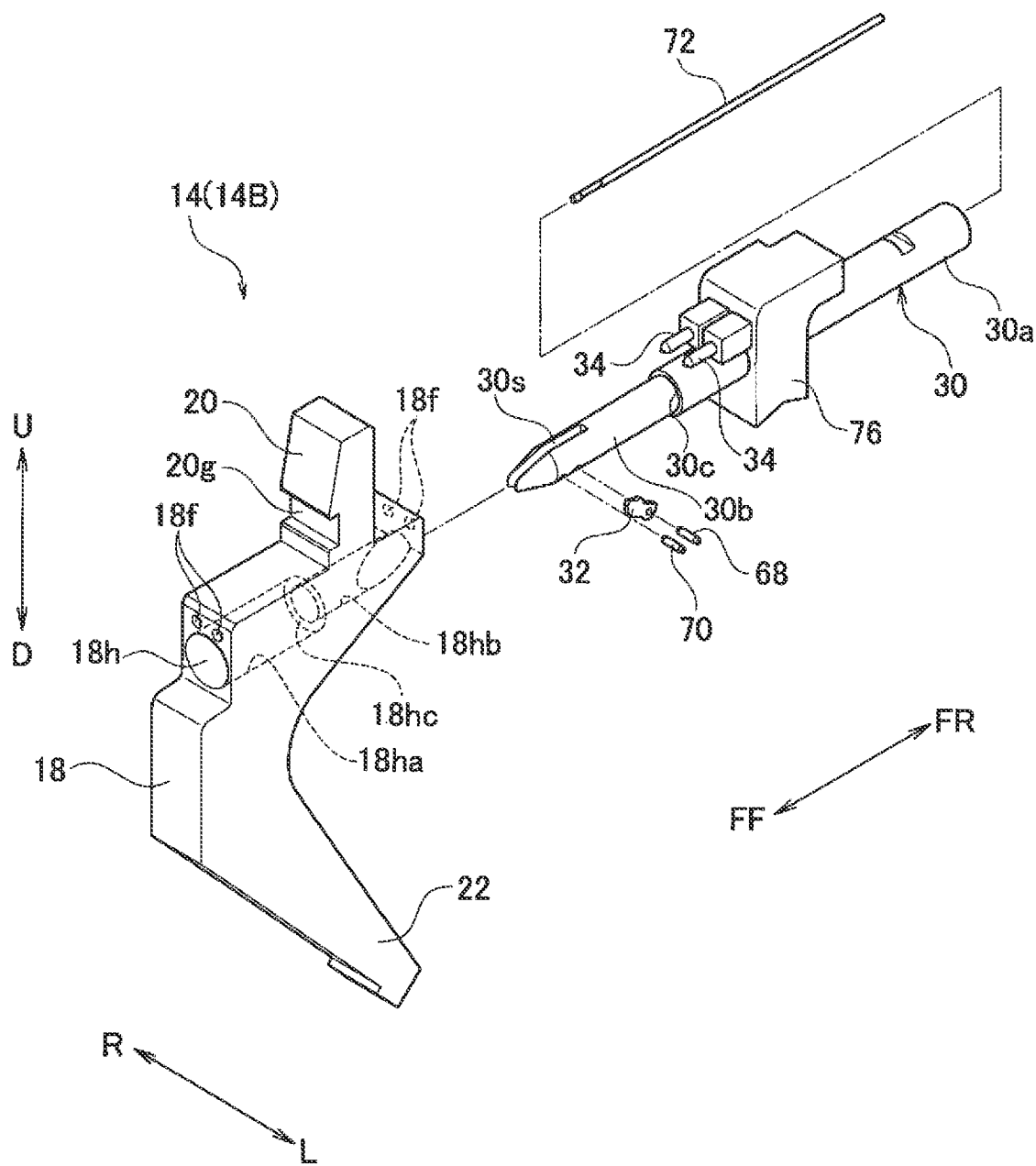
FIG. 7 is an exploded perspective view showing a relation between a peripheral configuration of a finger, including a pin-shaped anti-rotation member, and the upper tool.
Figure 8:
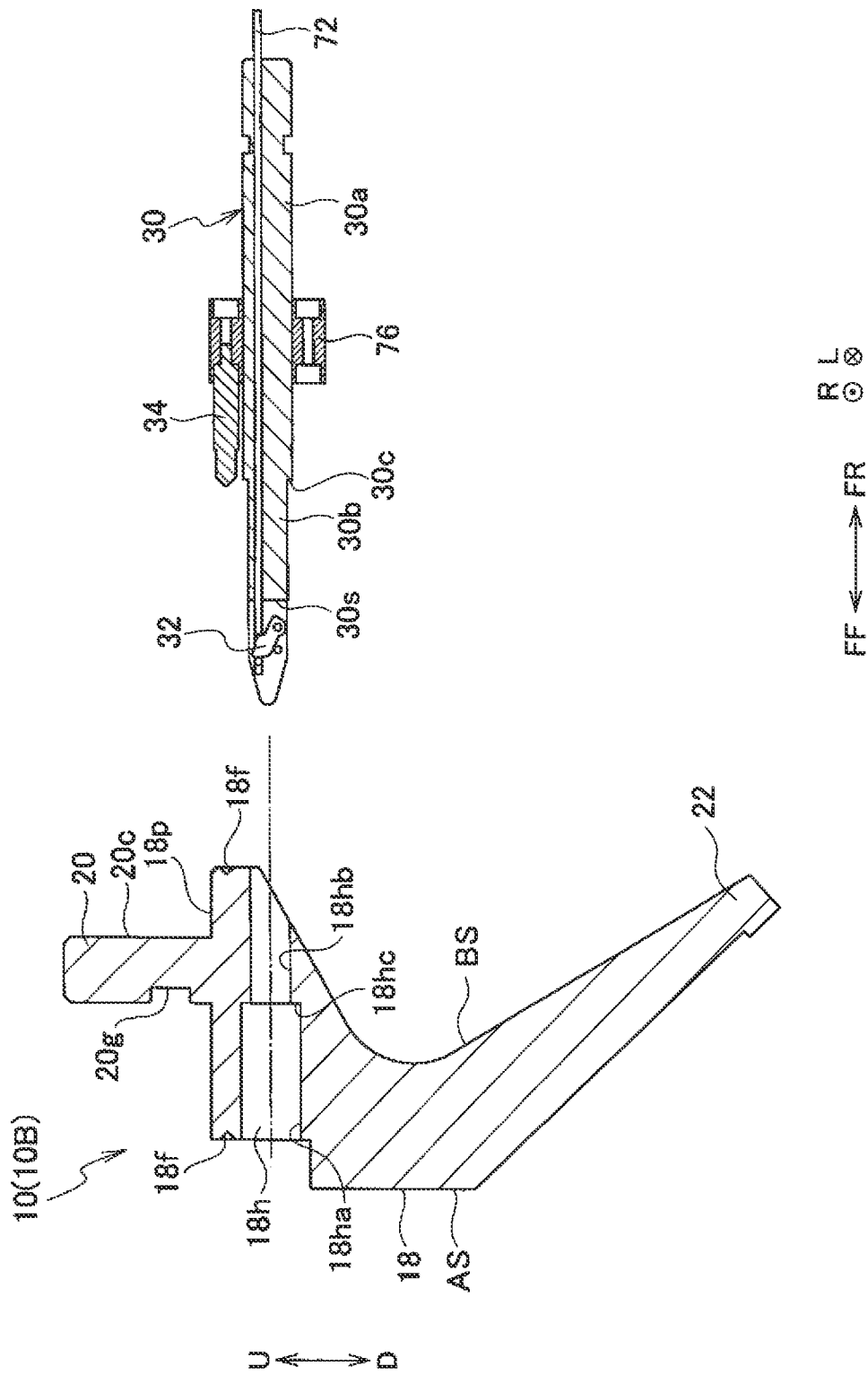
FIG. 8 is a side cross-sectional view showing a relation between the peripheral configuration of the finger, including the pin-shaped anti-rotation member, and the upper tool.

As shown in FIG. 1, FIG. 2, FIG. 7 and FIG. 8, the large diameter portion 30a of the finger 30 is provided with a slide block 76 that is slidable relative to the finger 30 in the front-rear direction. The sliding of the slide block 76 is guided by the finger 30 (the large-diameter portion 30a). In the support block 66 described above, a pair of slide rods 78 that are slidable in the front-rear direction relative to the support block 66 are supported. The slide block 76 is coupled integrally to tips (front ends) of the pair of slide rods 78, and a connecting member 80 is coupled to base ends (rear ends) of the pair of slide rods 78. Note that the slide block 76 shown in FIG. 7 and FIG. 8 is different in shape from the slide block 76 shown in FIG. 1 and FIG. 2, but has the same function (schematically shown in FIG. 7 and FIG. 8).

The above described plurality of pin-shaped anti-rotation members 34 that prevent rotation of the upper tool 10 supported by the finger 30 are attached to front surface of the slide block 76. The plurality of anti-rotation member 34 are arranged in a linearly symmetrical manner to a virtual vertical line passing an axial center of the finger 30 (a center line in the up-down direction). Each of the distal ends of the anti-rotation members 34 is formed in a conical (tapered) shape, and is engageable with the conical hole 18f. Each anti-rotation member 34 presses the upper tool 10 toward the engagement piece 32 protruded from the outer peripheral surface of the finger 30. That is, each anti-rotation member 34 cooperates with the engagement piece 32 protruded from the outer peripheral surface of the finger 30 to clamp the upper tool 10. Note that the distal end of each anti-rotation member 34 may be formed in a polygonal prism shape such as a columnar or quadrangular prism shape.

The third slider is provided with a hydraulic cylinder 82 as an actuator that moves the plurality of anti-rotation members 34 in the front-rear direction to the third slider 62. The hydraulic cylinder 82 includes a piston rod 82r that is movable in the front-rear direction, and a tip of the piston rod 82r is coupled to the connecting member 80. Thus, the hydraulic cylinder 82 is driven, so that the plurality of anti-rotation members 34 may be moved integrally with the slide block 76 in the front-rear direction to be engaged in and disengaged from the conical holes 18f.

Subsequently, advantages of the embodiment will be described.

Upon releasing the pressing of the attachment portion 20 with the first clamp 26 and the second clamp (the upper tool 10 does not drop down), the first slider 46 is moved in the right-left direction, and the finger 30 is opposed to the engagement hole 18h. Next, the second slider 56 moves forward to insert the finger 30 into the engagement hole 18h. The outer stepped portion 30c of the finger 30 abuts on the peripheral edge portion of the engagement hole 18h. The engagement piece 32 protrudes from the outer peripheral surface of the finger 30, to engage with the peripheral edge portion of the engagement hole 18h or the inner stepped portion 18hc of the engagement hole 18h. Consequently, the upper tool 10 is clamped between the engagement piece 32 and the outer stepped portion 30c of the finger 30. Next, the anti-rotation members 34 are moved forward integrally with the slide block 76, and the distal ends of the anti-rotation members 34 engage in the conical holes 18f, respectively. As a result, the upper tool 10 is supported by the finger 30 in a non-rotatable state to the finger 30. Then, the first slider 46 is moved to the right (or to the left), so that the upper tool 10 is removed from the upper tool holder 14 (the upper table 16) while keeping a vertical posture.

If the width of the upper tool 10 is smaller than a space between the adjacent upper tool holders 14, the following operation may be performed. The upper tool 10 is supported by the finger 30, and then the first slider 46 is moved in the right-left direction, to once stop the upper tool 10 between the adjacent upper tool holders 14. Then, the second slider 56 is moved rearward, so that the upper tool 10 is removed from the upper tool holder 14 (the upper table 16) while keeping the vertical posture.

In a case where the upper tool 10 is installed to the upper tool holder 14, an operation reverse to the above operation is performed. In this way, the upper tool 10 can be automatically changed (installed and removed) for the upper tool holder 14.

Also, in a case where the upper tool 10 is automatically changed for the upper stocker of the tool storage, a similar operation as performed. Consequently, the upper tool 10 can automatically changed between the plurality of upper tool holders 14 and the upper stocker.

As described above, the engagement hole 18h having the circular cross-sectional shape to be engaged with the finger 30 extends through the tool main body 18 in the thickness direction. The plurality anti-rotation bottomed depressed portions (the conical holes 18f) that receive the distal ends of the anti-rotation members 34, respectively, are formed in the vicinity of the engagement hole 18h on each of the opposite surfaces of the tool main body 18. The conical holes 18f are engageable with the distal ends of the anti-rotation members 34, respectively. Consequently, if the finger 30 is inserted into the engagement hole 18h, the engagement piece 32 is engaged with the peripheral edge portion or the inner stepped portion 18hc of the engagement hole 18h, and the distal ends of the anti-rotation members 34 engage in the conical holes 18f, respectively. As a result, the posture of the upper tool 10 to the finger 30 can be stabilized, while inhibiting the rotation of the upper tool 10 to the finger 30.

In particular, since the plurality of conical holes 18f are arranged in a linearly symmetrical manner to the predetermined virtual line VL, tilting of the upper tool 10 due to resistance (inertia) during the movement of the upper tool 10 in the right-left direction can be inhibited, and the posture of the upper tool 10 to the finger 30 can be further stabilized.

Thus, according to the embodiment, even if the upper tool 10 is not provided with a member corresponding to an operation member extending in the vertical direction (the direction along the height of the upper tool 10) (see Patent Literatures 1 and 2) or an elongated hole, the upper tool 10 can be automatically changed for the plurality of upper tool holders 14 of the press brake by using the tool changer 12.

Therefore, according to the embodiment, the height of the upper tool 10 to be automatically changed is set to about the same as a height of a usual upper tool (not shown), and the usual upper tool is post-processed. Consequently, the tool can be used as the upper tool 10 to be automatically changed. Furthermore, difficulty in production of the upper tool 10 to be automatically changed is eliminated, while production time for the upper tool 10 to be automatically changed can be shortened. That is, the upper tool 10 of the embodiment is easy to be produced (can be produced by modifying the existing tool) and is suitable for the automatic change.

Modification 1 of Embodiment

Figure 11:
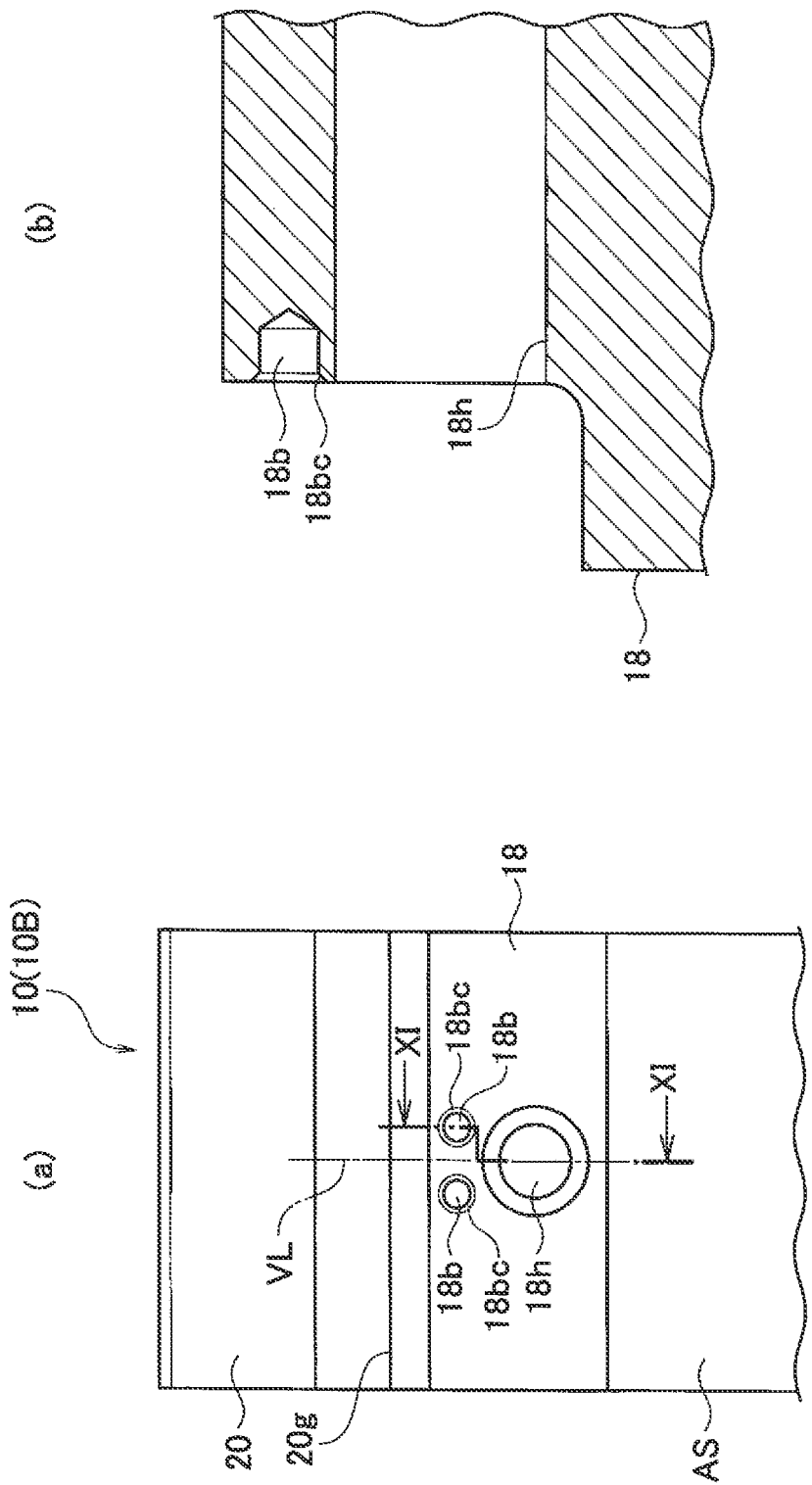
FIG. 11(a) is a partial front view of a goose-neck type upper tool in which a plurality of anti-rotation bottomed depressed portions (columnar holes) are formed in a tool main body.
FIG. 11(b) is a cross-sectional view taken along the XI-XI line in FIG. 11(a).

As shown in FIG. 11, a plurality of columnar holes 18b are formed as a plurality of anti-rotation bottomed depressed portions in a vicinity of an engagement hole 18h on each of opposite surfaces of a tool main body 18. The columnar holes 18b are positioned above the engagement hole 18h of the tool main body 18. A beveled portion 18bc is formed in a peripheral edge portion of each of the columnar holes 18b. An opening area of each columnar hole 18b is smaller than an opening area of the engagement hole 18h. The columnar holes 18b are engage able with distal ends of pin-shaped anti-rotation members 34, respectively, and come in line contact with the distal ends of the anti-rotation members 34, respectively. The plurality of columnar holes 18b are arranged in a linearly symmetrical manner to a predetermined virtual line VL. Note that if at least one of the plurality of columnar holes 18b is engageable with the distal end of the anti-rotation member 34, the remaining columnar holes 18b do not have to be engageable with the distal ends of the an members 34.

Also, according to the present modification 1, advantages similar to those of the above described embodiment are obtained.

Furthermore, according to the present modification 1, since the beveled portion 18bc is formed in the peripheral edge portion of each columnar hole 18b, the columnar hole 18b does not have any sharp edges. Therefore, damages such as cracks of the tool main body 18 due to the contact of the tool main body 18 with the anti-rotation member 34 can be prevented.

Modification 2 of Embodiment

Figure 12:
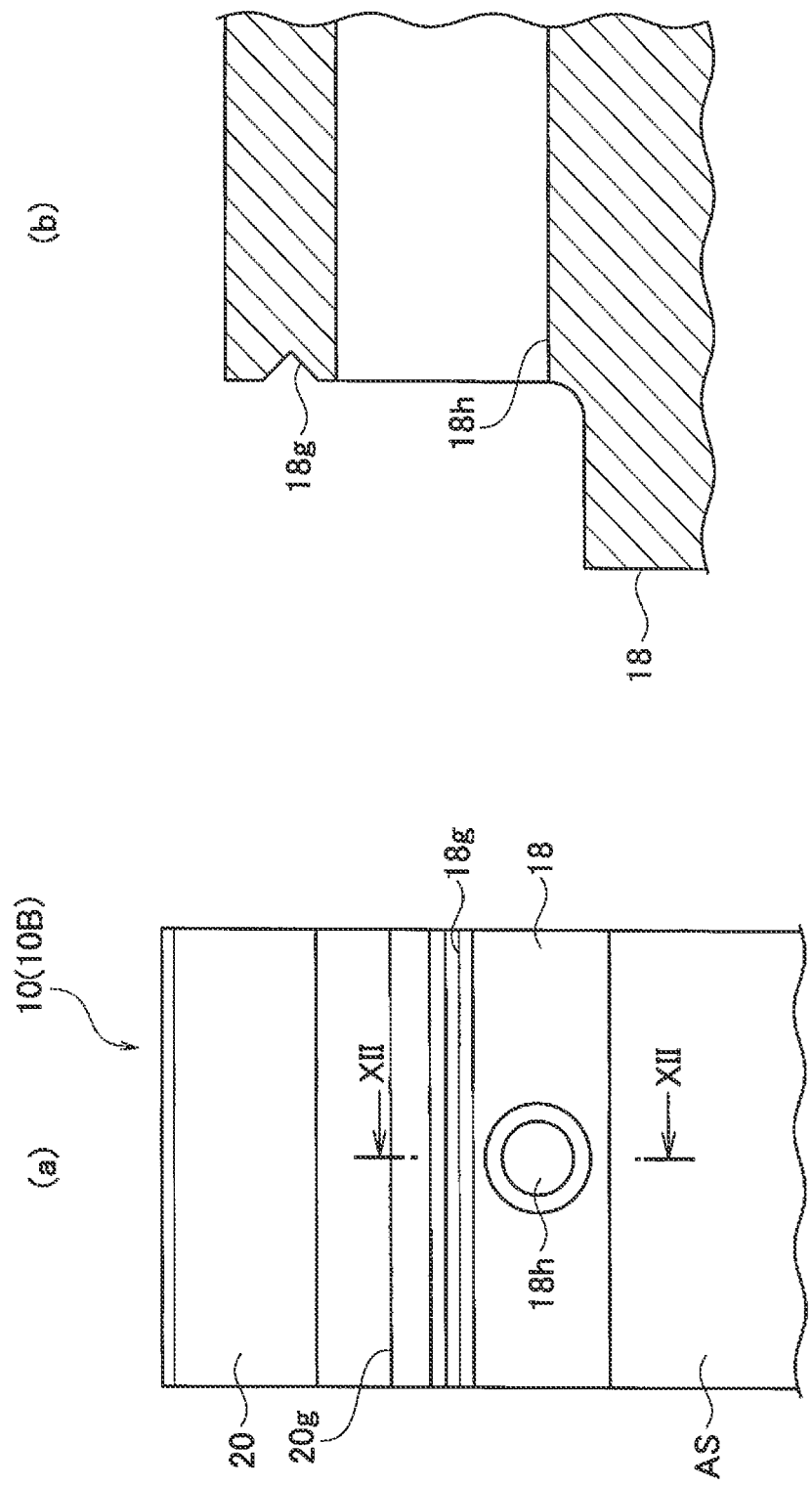
FIG. 12(a) is a partial front view of a goose-neck type upper tool in which an anti-rotation bottomed depressed portion (a through groove having a V-shaped cross section) is formed in a tool main body.
FIG. 12(b) is a cross-sectional view taken along the XII-XII line in FIG. 12(a).
Figure 13:
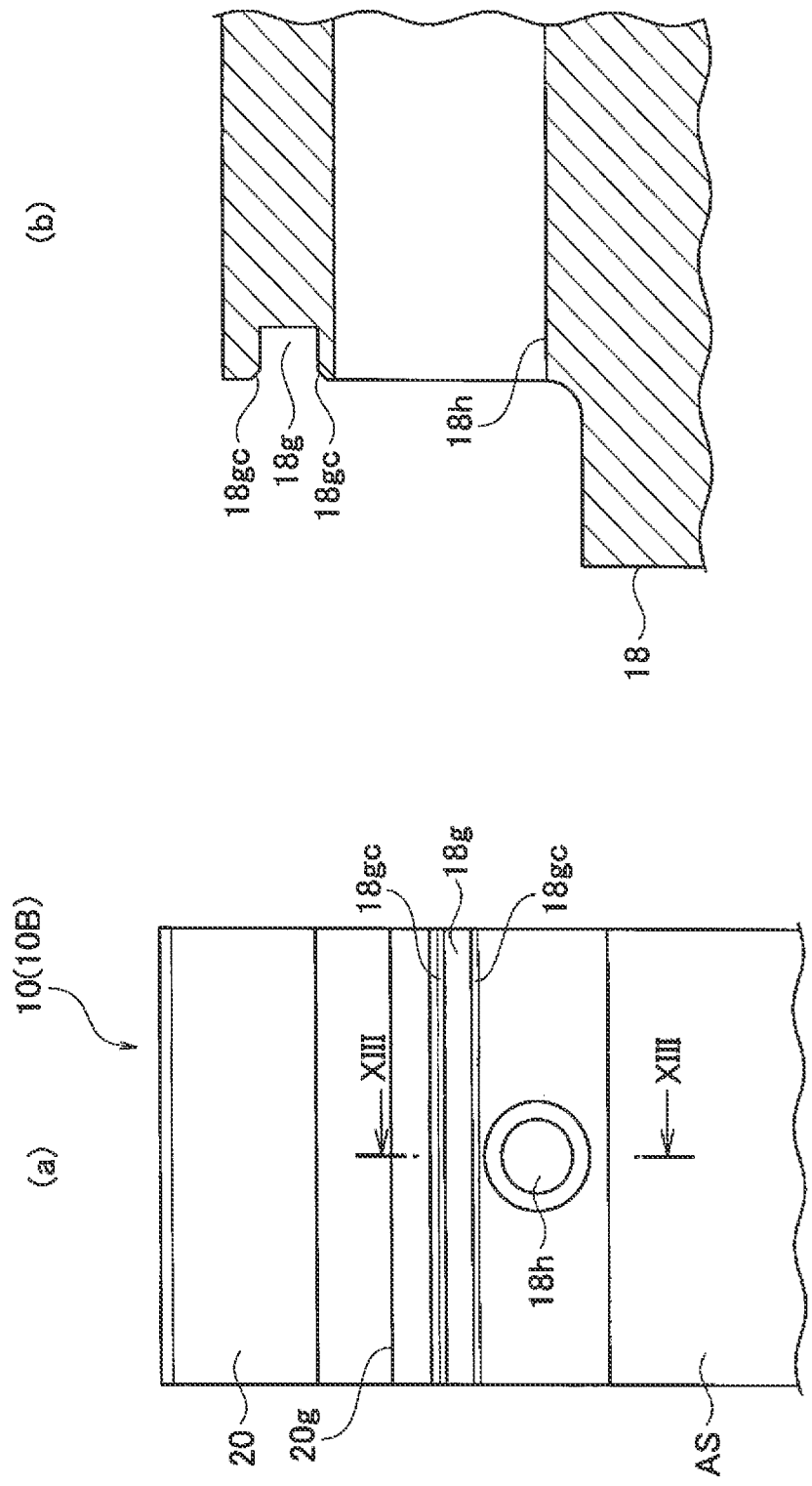
FIG. 13(a) is a partial front view of the goose-neck type upper tool in which an anti-rotation bottomed depressed portion (a through groove having a rectangular cross section) is formed in the tool main body.
FIG. 13(b) is a cross-sectional view taken along the XIII-XIII line in FIG. 13(a).
Figure 14:
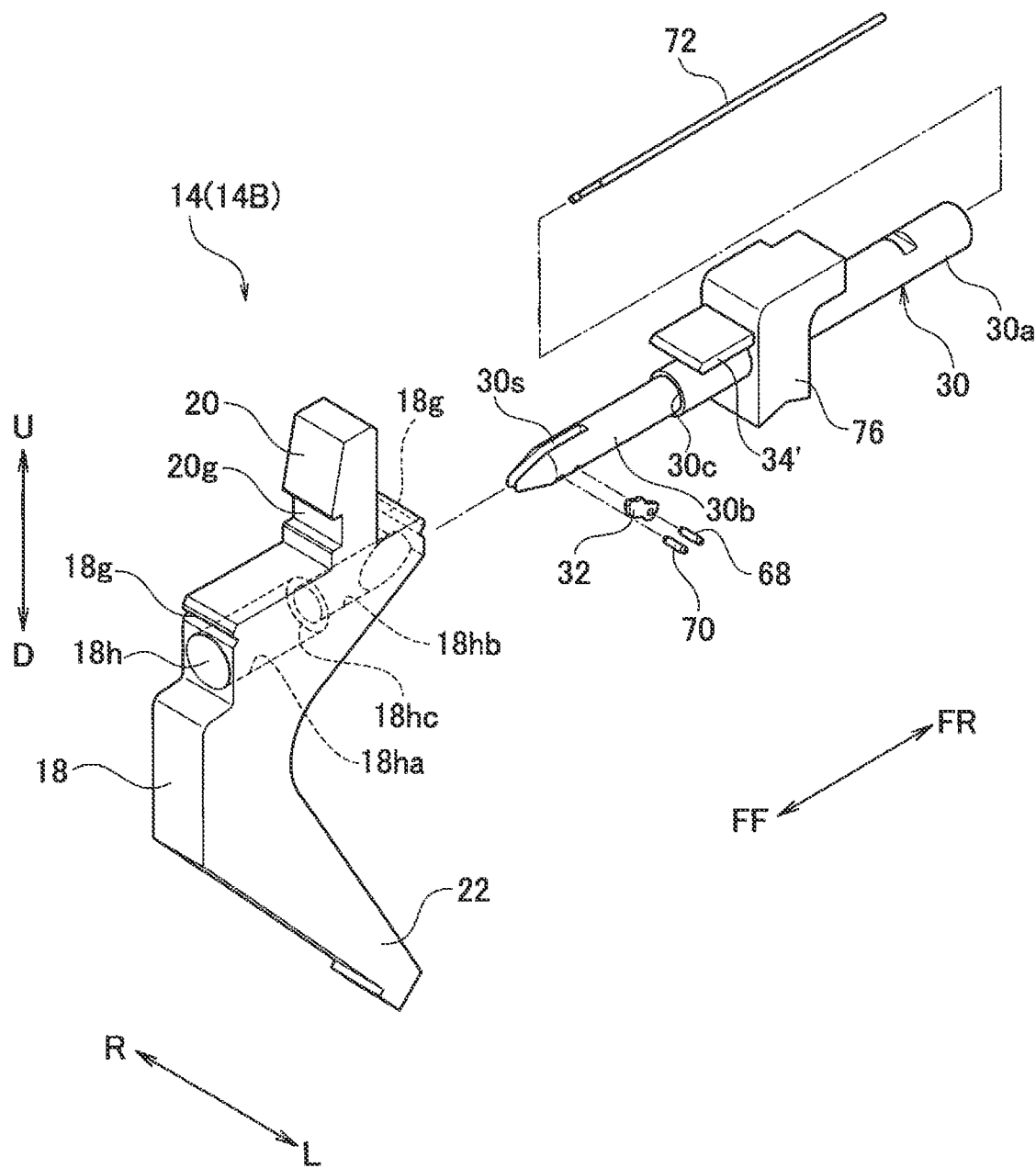
FIG. 14 is an exploded perspective view showing a relation between a peripheral configuration of a finger including a flat-plate shaped anti-rotation member and the upper tool.
Figure 15:
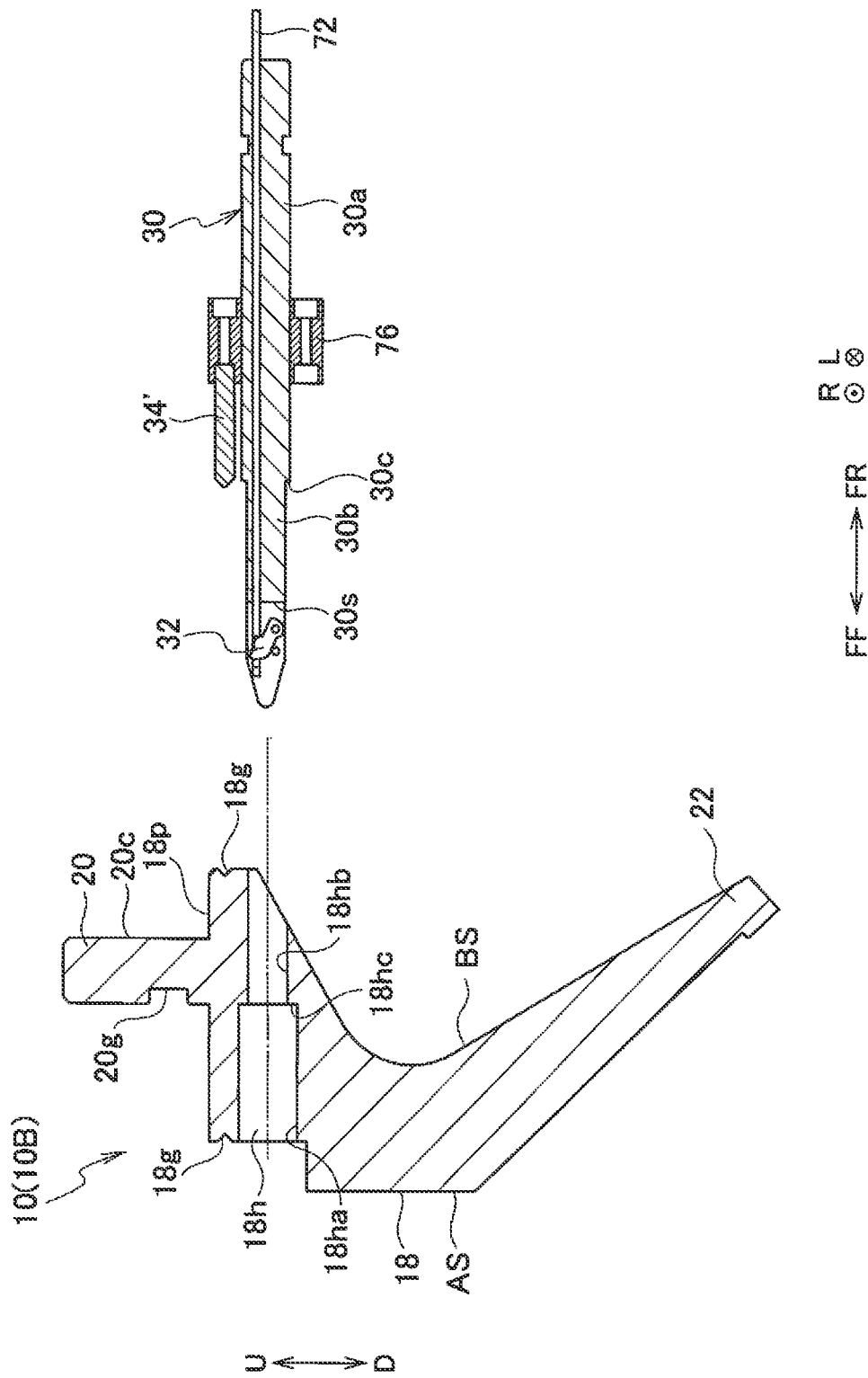
FIG. 15 is a cross-sectional view showing a relation between the peripheral configuration of the finger including the flat-plate shaped anti-rotation member and the upper tool.

As shown in FIG. 12 to FIG. 14, a through groove 18g having a V-shaped cross section or rectangular cross section and extending in a lateral direction is formed as an anti-rotation bottomed depressed portion in a vicinity of an engagement hole 18b on each of opposite surfaces of a tool main body 18. The through groove 18g is positioned above the engagement hole 18h. A beveled portion 18gc is formed in each edge portion of the through groove 18g having the rectangular cross section. The through groove 18g is engageable with a distal end of a flat-plate shaped anti-rotation member 34' provided on a front surface of a slide block 76, and comes in line contact or surface contact with a distal end of the anti-rotation member 34'. Note that the through groove 18g may be engageable with distal ends of a plurality of pin-shaped anti-rotation members 34 (see FIG. 7 and FIG. 8).

According to the present modification 2, if a finger 30 is inserted into the engagement hole 18h, an engagement piece 32 is engaged with a peripheral edge portion or an inner stepped portion 18*hc* of the engagement hole 18*h*, and the distal end of the flat-plate shaped anti-rotation member 34' engages with the through groove 18*g*. As a result, a posture of an upper tool 10 to the finger 30 can be stabilized, while inhibiting rotation of the upper tool 10 to the finger 30.

In particular, since the through groove 18*g* extends in the lateral direction, a contact area of an inner surface of the through groove 18*g* with the anti-rotation member 34' can be sufficiently acquired. Therefore, tilting of the upper tool 10 due to resistance (inertia) during movement of the upper tool 10 in a right-left direction can be inhibited, and the posture of the upper tool 10 to the finger 30 can be further stabilized.

Also, according to the present modification 2, advantages similar to those of the above described embodiment are obtained.

Furthermore, according to the present modification 2, since the beveled portion 18*gc* is formed in each edge portion of the through groove 18*g* having the rectangular cross section, the through groove 18*g* does not have any sharp edges. Therefore, damages such as cracks of the tool main body 18 due to the contact of the tool main body 18 with the anti-rotation member 34' or 34 can be prevented.

Modification 3 of Embodiment

Figure 16:
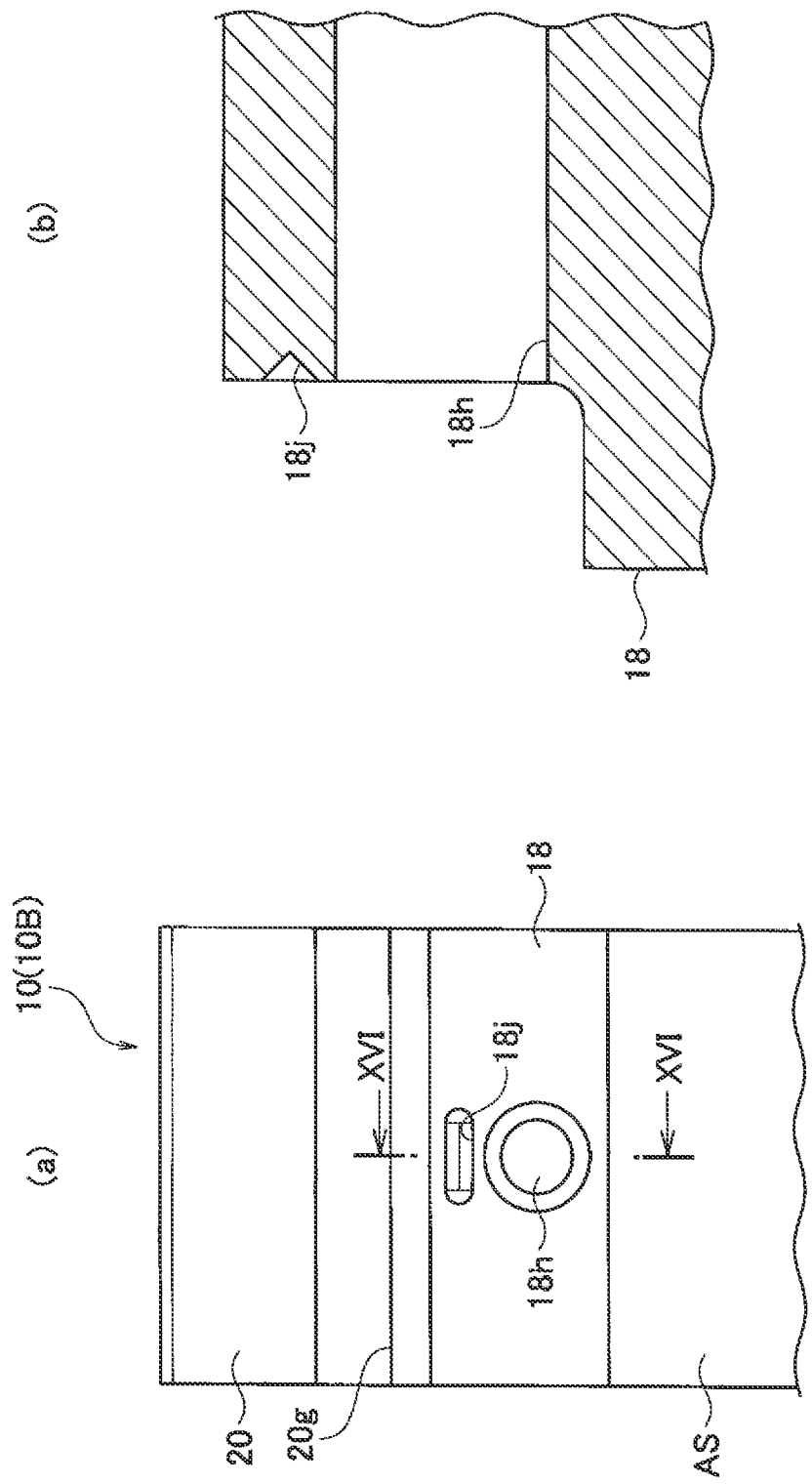
FIG. 16(a) is a partial front view of a goose-neck type upper tool in which an anti-rotation bottomed depressed portion (an elongated hole having a V-shaped cross section) is formed in a tool main body.
FIG. 16(b) is a cross-sectional view taken along the XVI-XVI line in FIG. 16(a).

As shown in FIG. 16 and FIG. 17, an elongated hole 18*j* having a V-shaped cross section or a rectangular cross section and extending in a lateral direction is formed as an anti-rotation bottomed depressed portion in a vicinity of an engagement hole 18*h* on each of opposite surfaces of a tool main body 18. The elongated hole 18*j* is positioned above the engagement hole 18*h*. A beveled portion 18*jc* is formed in each edge portion of the elongated hole 18*j* having the rectangular cross section. The elongated hole 18*j* is engageable with a distal end of a flat-plate shaped anti-rotation member 34' (see FIG. 14 and FIG. 15), and comes in line contact or surface contact with a distal end of the anti-rotation member 34'. Note that the elongated hole 18*j* may be engageable with distal ends of a plurality of pin-shaped anti-rotation members 34 (see FIG. 7 and FIG. 8).

Also, according to the present modification 3, advantages similar to those of the above described modification 2 are obtained.

The present invention is not limited to the above embodiments, and can be embodied, for example, in various aspects as follows. The tip portion of the finger 30 may be formed in a cylindrical shape, and in the tip portion of the finger 30, a slit extending in the front-rear direction may be formed. In this case, if a tapered push rod is pushed into the finger 30, an outer diameter of the tip portion of the finger 30 is enlarged, and the tip portion is pressed onto the inner peripheral surface of the engagement hole 18*h*. As a result, the tool 10 is supported by the finger 30. Furthermore, a configuration applied to the upper tool 10 may be applied to a lower tool (not shown) to be detachably attached to a lower tool holder (a tool installation portion omitted from the drawings) of the press brake. The present invention also extends to the upper tool 10 used (for use) in a general-purpose press brake that is not equipped with the tool changer 12.

All contents of Japanese Patent Application Nos. 2018-134151 (filed on Jul. 17, 2018), 2018-134168 (filed on Jul. 17, 2018), 2018-140886 (filed on Jul. 27, 2018), 2018-169366 (filed on Sep. 11, 2018), 2019-8743 (filed on May 7, 2019), 2019-92892 (filed on May 16, 2019), 2019-109717 (filed on Jun. 12, 2019), 2019-111277 (filed on Jun. 14, 2019), and 2019-126935 (filed on Jul. 8, 2019) are referred to herein and accordingly fully incorporated herein. The present invention has been described above with reference to the embodiments of the present invention, but the present invention is not limited to the above embodiments. The scope of the present invention is determined in the context of claims.

The invention claimed is:

1. A tool for a press brake, comprising:
a tool main body formed between an attachment portion and a bending portion,
the attachment portion formed on a base end side of the tool main body and configured to be detachably attached to a tool installation portion of the press brake by using a tool changer, and
the bending portion formed on a distal end side of the tool main body,
wherein a through hole that has a circular cross-sectional shape to be engaged with a bar-shaped finger of the tool changer and extends through the tool main body in a thickness direction of the tool main body such that the through hole is configured to be open and accessible at both an anterior surface and a back surface of the tool main body to allow engagement with and disengagement from the bar shaped finger of the tool changer when the attachment portion is attached to the tool installation portion of the press brake,
wherein two anti-rotation bottomed holes each of which is configured to receive a distal end of an anti-rotation member of the tool changer are formed in a vicinity of the through hole in the tool main body,
wherein the two anti-rotation bottomed holes are arranged in a linearly symmetrical manner to a virtual line passing a center of the through hole in parallel with a vertical direction extending between the base end side and the distal end side of the tool main body,
wherein the two anti-rotation bottomed holes are located independently and spaced apart from the through hole on at least one of the anterior surface and the back surface of the tool main body,
wherein each opening of the anti-rotation bottomed recessed holes is co-planar with at least a part of an opening of the through hole on the at least one of the anterior surface and the back surface of the tool main body, and
each opening area of the two anti-rotation bottomed holes is smaller than an opening area of the through hole.

2. The tool according to claim 1, wherein each of the two anti-rotation bottomed holes is a conical hole or a columnar hole of the tool changer.

3. A tool for a press brake, comprising:
a tool main body formed between an attachment portion and a bending portion,
the attachment portion formed on a base end side of the tool main body and configured to be detachably attached to a tool installation portion of the press brake, and
the bending portion formed on a distal end side of the tool main body,
wherein a through hole that has a circular cross-sectional shape and is formed in a thickness direction in the tool main body such that the through hole is configured to be opened on both an anterior face and a back face of the tool main body to allow for engagement with and disengagement from a bar-shaped finger of a tool changer when the attachment portion is attached to the tool installation portion of the press brake, two bottomed holes are formed in a vicinity of the through hole in the tool main body, wherein the two bottomed holes are arranged in a linearly symmetrical manner to a virtual line passing a center of the through hole in parallel with a vertical direction extending between the base end side and the distal end side of the tool main body, wherein the two bottomed holes are located independently and spaced apart from the through hole on at least one of the anterior surface and the rear surface of the tool main body, wherein each opening of the two bottomed recessed holes is co-planar with at least a part of an opening of the through hole on the at least one of the anterior surface and the back surface of the tool main body, and wherein each opening area of the two bottomed holes is smaller than an opening area of the through hole.

4. The tool according to claim 3, wherein each of the two bottomed holes is a conical hole or a columnar hole.

5. The tool according to claim 3, wherein each of the two bottomed holes is a columnar hole, and
a beveled portion is formed in a peripheral edge portion of the columnar hole.

* * * * *